(12) United States Patent
Haubert

(10) Patent No.: US 7,094,021 B2
(45) Date of Patent: Aug. 22, 2006

(54) GAS TURBINE FLOWPATH STRUCTURE

(75) Inventor: Richard Clay Haubert, Hamilton, OH (US)

(73) Assignee: General Electric Company, Schenectady, NY (US)

( * ) Notice: Subject to any disclaimer, the term of this patent is extended or adjusted under 35 U.S.C. 154(b) by 174 days.

(21) Appl. No.: 10/769,947

(22) Filed: Feb. 2, 2004

(65) Prior Publication Data

US 2005/0169759 A1    Aug. 4, 2005

(51) Int. Cl.
*F01D 5/18* (2006.01)

(52) U.S. Cl. .................... 415/115; 415/191; 415/211.2; 416/96 R; 416/193 A; 416/226; 416/241 B

(58) Field of Classification Search ................ 415/115, 415/191, 208.2, 211.2; 416/96 R, 97 R, 416/193 A, 244, 226, 241 B
See application file for complete search history.

(56) References Cited

U.S. PATENT DOCUMENTS

| | | | | |
|---|---|---|---|---|
| 3,389,889 | A * | 6/1968 | Penny | ........................ 416/92 |
| 4,343,593 | A | 8/1982 | Harris | |
| 4,648,921 | A | 3/1987 | Nutter, Jr. | |
| 4,802,824 | A * | 2/1989 | Gastebois et al. | ...... 416/193 A |
| 5,244,345 | A * | 9/1993 | Curtis | ........................ 416/95 |
| 5,403,153 | A | 4/1995 | Goetze | |
| 6,274,078 | B1 | 8/2001 | Dunyak et al. | |
| 6,544,003 | B1 | 4/2003 | Grylls et al. | |
| 6,627,019 | B1 | 9/2003 | Jarmon et al. | |
| 6,696,144 | B1 * | 2/2004 | Holowczak et al. | ..... 428/293.4 |

FOREIGN PATENT DOCUMENTS

DE        3539903 A1 *   5/1987
GB        2027496 A  *   2/1980

* cited by examiner

*Primary Examiner*—Ninh H. Nguyen
(74) *Attorney, Agent, or Firm*—McNees Wallace & Nurick LLC

(57) ABSTRACT

A turbine flowpath structure includes a first generally U-shaped flowpath channel having a first leg having a first inwardly facing side shaped as a turbine blade suction-side airfoil surface, a second leg having a second inwardly facing side shaped as a turbine blade pressure-side airfoil surface, and a web connecting the first leg and the second leg, wherein the web has an inwardly facing inner flowpath surface. There is typically provided a spar that engages at least one of the first leg and the second leg. In one application, there is a plurality of the generally U-shaped flowpath channels arranged around the periphery of a turbine disk, and a plurality of spars positioned between each pair of adjacent generally U-shaped flowpath channels to anchor them to the turbine disk.

23 Claims, 3 Drawing Sheets

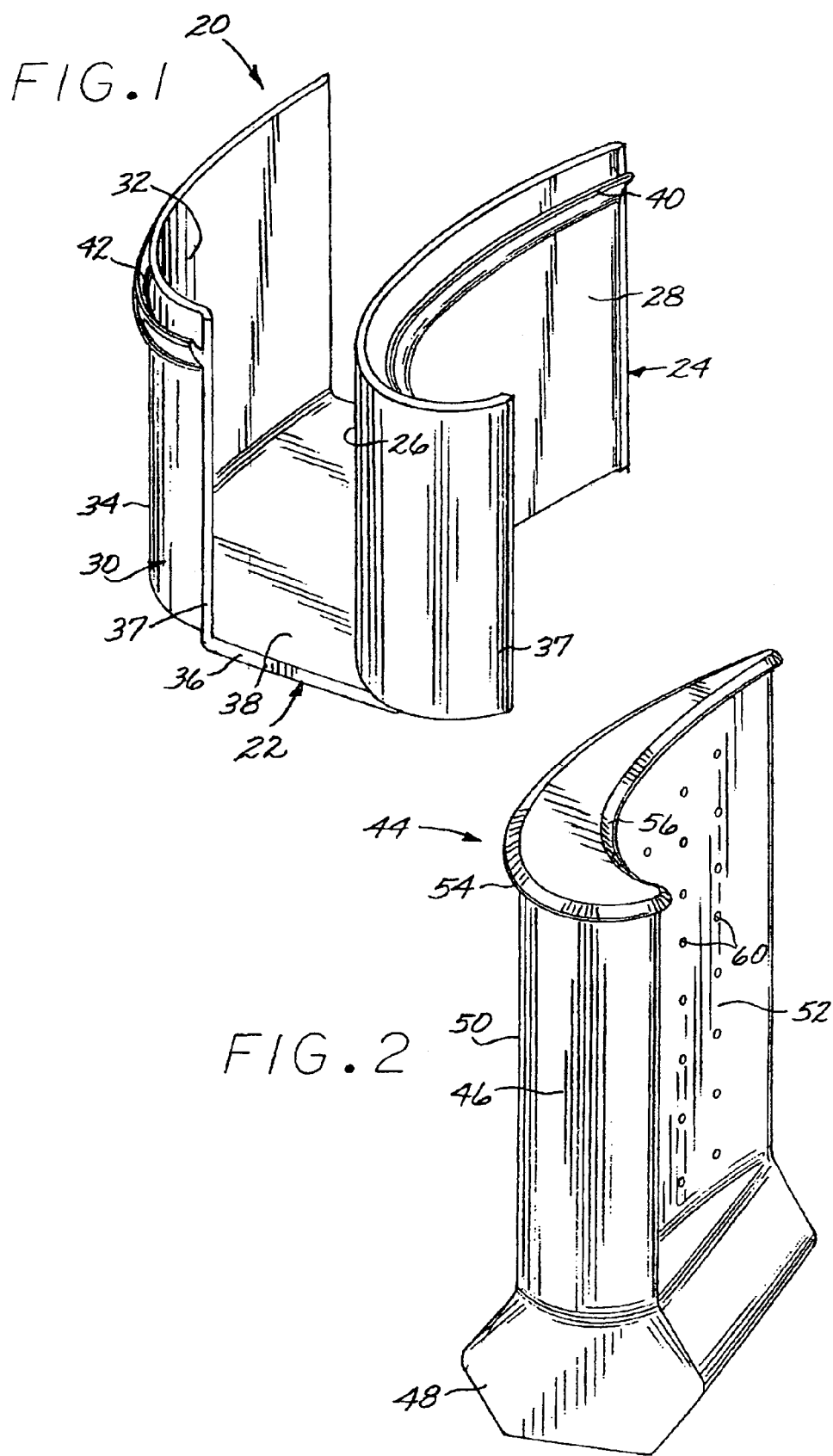

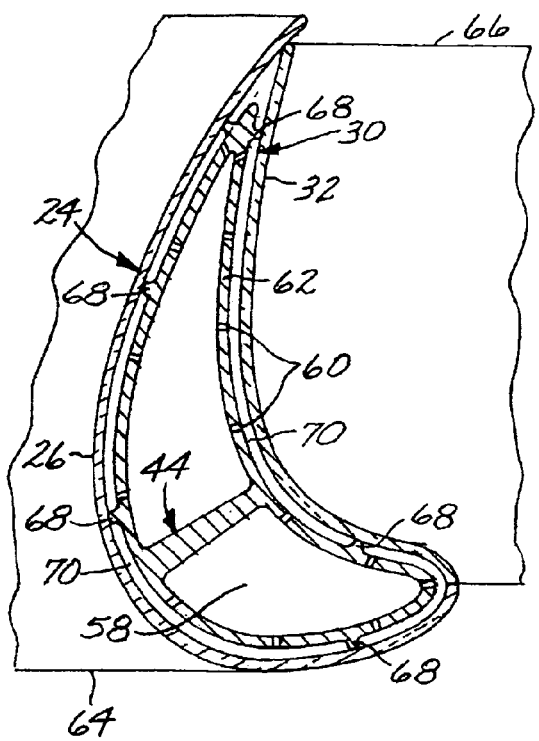
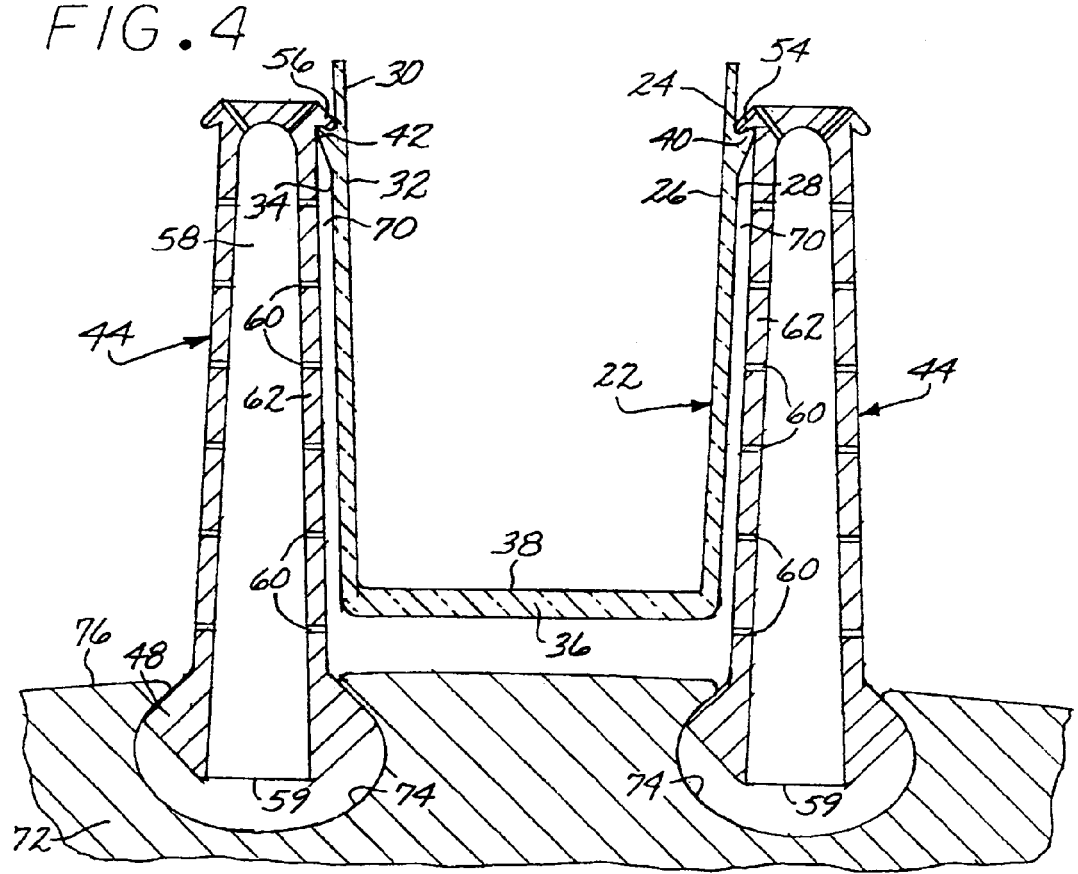

GAS TURBINE FLOWPATH STRUCTURE

This invention relates to gas turbine engines and, more particularly, to the gas flowpath structure of the turbine.

BACKGROUND OF THE INVENTION

In an aircraft gas turbine (jet) engine, air is drawn into the front of the engine, compressed by a shaft-mounted compressor, and mixed with fuel. The mixture is combusted, and the resulting hot combustion gases are passed through a turbine mounted on the same shaft. The flow of gas turns the turbine by contacting an airfoil portion of the turbine blade that is positioned in the gas flowpath, which turns the shaft and provides power to the compressor. The hot exhaust gases flow from the back of the engine, driving it and the aircraft forward. There may additionally be a bypass fan that forces air around the center core of the engine, driven by a shaft extending from the turbine section.

The efficiency of the gas turbine engine increases with increasing temperature of the hot combustion gases, and there is therefore an incentive to operate the engine at higher combustion-gas temperatures. However, the ability to increase the combustion-gas temperature is limited by the permissible maximum operating temperatures of the components that are subjected to the highest temperatures.

One of the most demanding applications in the gas turbine engine is the turbine blades, upon which the hot combustion gases impinge, and which are also under high loads. Many techniques have been used to increase the operating temperatures of the gas turbine blades, including the use of improved metallic materials, improved manufacturing techniques, and insulating coatings. The turbine blades may be hollow, so that cooling air may be forced through the hollow turbine blades to openings from which the cooling air is expelled.

The use of ceramic gas turbine blades has been discussed and evaluated, but at this time ceramic gas turbine blades have not yet entered service. Some ceramic materials are operable to higher temperatures than are the best available metallic alloys. However, ceramic materials also tend to be of low ductilities and thence low fracture toughnesses, which may lead to premature failure of the ceramic materials in service. One possible solution is to use ceramic matrix composite (CMC) materials in which a ceramic or metallic fiber is embedded in a ceramic matrix. An example is silicon carbide fibers embedded in a silicon carbide matrix. Such CMC materials have better fracture toughnesses than do the monolithic ceramic materials.

On the other hand, the most promising of the CMC materials must be cooled, even though they are ceramics, because their maximum service temperatures in the gas turbine application are near to or less than the combustion-gas temperature. The cooling may be accomplished in essentially the same manner that conventional metallic turbine blade materials are cooled, with a flow of bleed compressor air. There have been techniques proposed to manufacture cooled turbine blades from CMC materials. The proposed techniques are complex and expensive, and have limited success.

There is therefore a need for an improved approach to the manufacture of cooled gas turbine blades from CMC materials and other types of materials, particularly low-ductility materials. The present invention fulfills this need, and further provides related advantages.

SUMMARY OF THE INVENTION

The present approach provides a turbine flowpath structure that is particularly suited to the use of cooled ceramic materials of construction, such as ceramic-matrix composite materials. All of the surfaces of the turbine flowpath structure are readily accessible for fabrication and machining, including the surfaces facing away from the flowpath. The fabrication of inaccessible cooling passages in the turbine flowpath structure is not required.

A turbine flowpath structure comprises a first generally U-shaped flowpath channel including a first leg having a first inwardly facing side shaped as a turbine blade suction-side airfoil surface, a second leg having a second inwardly facing side shaped as a turbine blade pressure-side airfoil surface, and a web connecting the first leg and the second leg. The web has an inwardly facing inner flowpath surface.

In the preferred construction, the turbine flowpath structure further includes a spar that engages at least one of the first leg and the second leg. The spar is hollow and has a cooling hole through a wall thereof. Preferably, the spar is spaced apart from the engaged one of the first leg and the second leg to define a cooling passage between the spar and the engaged one of the first leg and the second leg. The spar may engage at least one of the first leg and the second leg at a location at an end thereof remote from the web, or at a location intermediate between the web and an end thereof remote from the web.

The present approach is particularly advantageously applied where the U-shaped flowpath channel comprises a ceramic material. Preferably, the U-shaped flowpath channel comprises a ceramic-matrix-composite material, such as a silicon carbide-silicon carbide composite material. The spar is preferably made of a metallic material, such as a nickel-base superalloy. The spar is not directly exposed to the hot combustion gas and is cooled by the flow of cooling air that passes through it, so that it may be made of a metal.

The present configuration of the turbine flowpath structure is used to construct a turbine with the U-shaped flowpath channel and spar anchored to a periphery of the turbine disk. For this purpose, there is a second generally U-shaped flowpath channel having the same structure as the first generally U-shaped flowpath channel. A spar is positioned between the first generally U-shaped flowpath channel and the second generally U-shaped flowpath channel. The spar engages both the first leg of the first generally U-shaped flowpath channel and the second leg of the second generally U-shaped flowpath channel. The spar is anchored to a periphery of the turbine disk, thereby holding the first generally U-shaped flowpath channel and the second generally U-shaped flowpath channel to the turbine disk.

More specifically, a turbine flowpath structure is mounted to a turbine disk. The turbine flowpath structure comprises a plurality of U-shaped flowpath channels, where each U-shaped flowpath channel comprises a ceramic material and has a first leg having a first inwardly facing side shaped as a turbine blade suction-side airfoil surface, a second leg having a second inwardly facing side shaped as a turbine blade pressure-side airfoil surface. A web connects the first leg and the second leg and their inboard ends, and has an inwardly facing inner flowpath surface. A metallic spar is positioned between each adjacent pair of generally U-shaped flowpath channels. An inner end of each spar is anchored to a periphery of the turbine disk so that the spar extends radially outwardly from the periphery of the turbine disk. The spar engages the first leg of one of the adjacent generally U-shaped flowpath channels, and the second leg of the other of the other adjacent generally U-shaped flowpath channel, thereby holding the generally U-shaped flowpath channels to the turbine disk. This configuration is repeated around the entire periphery of the turbine disk and for all of the generally U-shaped flowpath channels and spars.

The present approach is a significant departure from the usual approach for turbine structures. In the usual approach, each turbine blade is fabricated with an airfoil having a suction side and a pressure side, and a platform to shield the underlying structure from the hot combustion gas. The turbine blade is anchored to the turbine disk. (The turbine blade may be prepared separately from the turbine disk, or integrally with the turbine disk.) If the turbine blade is to be cooled, internal cooling passages are cast and/or machined into the turbine blade. This approach is exceedingly difficult to implement when the turbine blade is to be made from a ceramic material.

In the present approach, by contrast, the suction side of one turbine blade, the pressure side of the adjacent turbine blade, and the web which provides the connection between the two sides and also the shielding function of the platform are fabricated as a single generally U-shaped flowpath channel. The generally U-shaped flowpath channels are assembled together and anchored to the periphery of the turbine blade by the spars, which provides a passage for cooling air for themselves and for the adjacent generally U-shaped flowpath channels. Each spar and U-shaped flowpath channel are configured with a standoff spacing between them. This design allows complete access during fabrication to all of the surfaces of the generally U-shaped flowpath channel, thereby greatly facilitating the fabrication processing. In service, cooling air is conducted from the turbine disk into the spar, and thence through holes in the sides of the spar. The cooling air impinges on the facing side of the U-shaped flowpath channel, thereby providing cooling of the ceramic material. The result is a cooled ceramic turbine blade structure that is much more readily produced than are conventional designs. The present configuration of the ceramic turbine blade structure is also more resistant to thermal shock than is a conventional design, because the individual legs of the U-shaped flowpath channel are not constrained in the same manner as are the sides of a conventional turbine blade. There are also vibration reduction and frictional damping benefits realized from the present approach.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

BRIEF DESCRIPTION OF THE DRAWINGS

FIG. 1 is a perspective view of a generally U-shaped flowpath channel;

FIG. 2 is a perspective view of a spar;

FIG. 3 is a view looking radially inwardly of portions of two generally U-shaped flowpath channels assembled with a spar;

FIG. 4 is a sectional view of a generally U-shaped flowpath channel and its two adjacent spars anchored to a turbine disk.

DETAILED DESCRIPTION OF THE INVENTION

Figure 5:
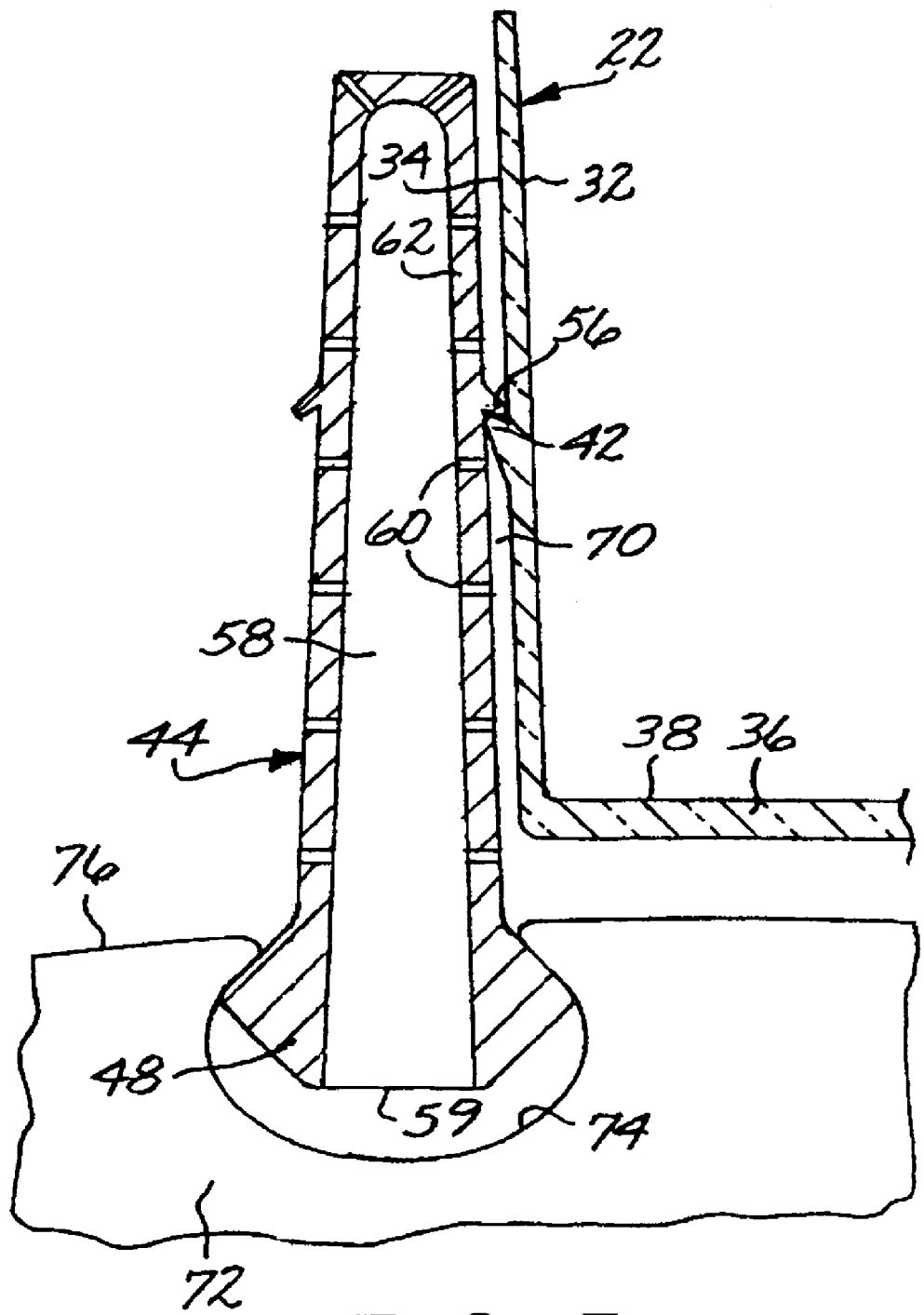
FIG. 5 is a sectional view similar to that of FIG. 4, illustrating a detail with the spar engaged to the generally U-shaped flowpath channel at mid-span.

FIG. 1 depicts a portion of a turbine flowpath structure 20. The turbine flowpath structure 20 includes a first generally U-shaped flowpath channel 22 having a first leg 24 with a first inwardly facing side 26 shaped as a turbine blade suction-side airfoil surface, and a first outwardly facing side 28. The generally U-shaped flowpath channel 22 further includes a second leg 30 having a second inwardly facing side 32 shaped as a turbine blade pressure-side airfoil surface, and a second outwardly facing side 34. The turbine flowpath structure 20 further includes a web 36 connecting the first leg 24 and the second leg 30 at a location near their inboard ends 37. The web 36 has an inwardly facing inner flowpath surface 38. There is a first channel engagement shoulder 40 on the first outwardly facing side 28 of the first leg 24, and a second channel engagement shoulder 42 on the second outwardly facing side 34 of the second leg 30. The functions of these engagement shoulders 40 and 42 will be discussed subsequently.

The generally U-shaped flowpath channel 22 is preferably a one-piece article made of a channel material of construction. The channel material of construction is preferably a ceramic such as a silicon carbide-silicon carbide ceramic matrix composite (CMC) material. Such CMC materials are known in the art for use in aircraft gas turbine engines, see for example U.S. Pat. Nos. 6,274,078 and 6,627,019, whose disclosures are incorporated by reference. However, such materials are not previously known in relation to a structure as discussed herein. The generally U-shaped flowpath channel 22 may be made by layup and subsequent processing as a single piece, followed by machining to define the precise shapes of the sides and surfaces 26, 28, 32, 34, and 38. As may be seen in FIG. 1, these sides and surfaces 26, 28, 32, 34, and 38 are all readily accessible for machining, coating, and other processing.

The turbine flowpath structure 20 further includes a spar 44 illustrated in FIG. 2. The spar 44 has an elongated body 46 with an integral spar anchor 48 at one end. Preferably, the spar body 46 includes a first side 50 that is generally (but not necessarily exactly) shaped to conform to the first outwardly facing side 28 of the first leg 24 of the generally U-shaped flowpath channel 22. Preferably, the spar body 46 includes a second side 52 that is generally (but not necessarily exactly) shaped to conform to the second outwardly facing side 34 of the second leg 30 of the generally U-shaped flowpath channel 22. At a location along the length of the first side 50 of the spar body 46 is a first spar engagement shoulder 54, and at a location along the length of the second side 52 of the spar body 46 is a second spar engagement shoulder 56. The locations and shapes of the first spar engagement shoulders 54 and the second spar engagement shoulder 56 are selected to engage the respective first channel engagement shoulder 40 of the first leg 24 and the second channel engagement shoulder 42 of the second leg 30 of the generally U-shaped flowpath channel 22.

The spar 44 is preferably made of a metal. The preferred material of construction is a nickel-base superalloy. As used herein, "nickel-base" means that the composition has more nickel present than any other element. The nickel-base superalloys are of a composition that is strengthened by the precipitation of gamma-prime phase or a related phase. A typical nickel-base superalloy has a composition, in weight percent, of from about 4 to about 20 percent cobalt, from about 1 to about 10 percent chromium, from about 5 to about 7 percent aluminum, from 0 to about 2 percent molybdenum, from about 3 to about 8 percent tungsten, from about 4 to about 12 percent tantalum, from 0 to about 2 percent titanium, from 0 to about 8 percent rhenium, from 0 to about 6 percent ruthenium, from 0 to about 1 percent niobium, from 0 to about 0.1 percent carbon, from 0 to about 0.01 percent boron, from 0 to about 0.1 percent yttrium, from 0 to about 1.5 percent hafnium, balance nickel and incidental impurities, although nickel-base superalloys may have compositions outside this range.

The spar 44 is hollow, as suggested in FIG. 2 and shown more clearly in FIGS. 3–5. Cooling gas, typically compressed air such as compressor bleed air, may enter an interior 58 of the spar 44 through an entry opening 59 (FIGS. 4–5) in the spar anchor 48. The cooling air flows through the interior 58 of the spar 44 and out through cooling holes 60 in a wall 62 of the spar 44.

FIG. 3 is a radially inward view of one spar 44 assembled to portions of a first generally U-shaped flowpath channel 64 and a second generally U-shaped flowpath channel 66, each of which has the structure described above in relation to the generally U-shaped flowpath channel 22. The first leg 24 and its first inwardly facing side 26 are supplied from the first generally U-shaped flowpath channel 64. The second leg 30 and its second inwardly facing side 32 are supplied from the second generally U-shaped flowpath channel 66.

The walls 62 of the spar 44 are provided with outwardly facing standoff spacers 68 that space the spar 44 apart from the facing first leg 24 and second leg 30, creating cooling passages 70 between the spar 44 and the first leg 24, and between the spar and the second leg 30. (Equivalently from a functional standpoint, the standoff spacers 68 may be formed in the first leg 24 and the second leg 30, although the machining of the metallic spar 44 is easier than the machining of the ceramic generally U-shaped flowpath channel 22.) The cooling air that flows from the cooling holes 60 of the wall 62 of the spar 44 flows through the cooling passages 70. The flow of cooling air thus cools the spar 44 as it passes through the interior 58 of the spar 44, and also cools the first leg 24 and the second leg 30 of each of the generally U-shaped flowpath channels 22 (and 64, 66). The spar 44 itself is insulated from the hot combustion gases by the first leg 24 and the second leg 30, so that the metallic spar 44 is never directly contacted by the hot combustion gases. The combination of this isolation of the metallic spar 44 from the hot combustion gases and the interior and exterior flows of cooling air ensure that the spar 44 never is heated to too-high a temperature during service. The ceramic web 36 (FIG. 1) of the generally U-shaped flowpath channel 22 protects the disk 72 from contact by the hot combustion gases that impinge against the pressure side of the generally U-shaped flowpath channel 22.

FIG. 4 illustrates the manner in which the generally U-shaped flowpath channels 22 (and 64, 66) are anchored to a turbine disk 72. The turbine disk 72 has recesses 74 cut into its periphery 76. The spar anchor 48 of each spar 44 is received into one of the recesses 74. Each U-shaped flowpath channel 22 is in turn retained by the two spars 44 on either side of it by engagement between the first spar engagement shoulder 54 and the first channel engagement shoulder 40, and between the second spar engagement shoulder 56 and the second channel engagement shoulder 42. The generally U-shaped flowpath channel 22 is not rigidly engaged at both ends, and instead "floats" lengthwise between the two spars 44. This floating engagement avoids the creation of excessive tensile and bending stresses in the generally U-shaped flowpath channel 22 as the structure is heated and cooled under centrifugal stresses produced as the turbine disk 72 turns.

The portions of the legs 24, 30 of the generally U-shaped flowpath channel 22 that are closer to the web 36 than the location of the engagement shoulders 40, 42 are in compression, and the portions further from the web 36 than the engagement shoulders 40, 42 are in tension, during service when the turbine disk 72 is rotating rapidly. Ceramic materials are generally stronger in compression than in tension. Nearly the entire lengths of the legs 24, 30 are loaded in compression in the embodiment of FIG. 4. However, ceramic materials do have some tensile strength, and this capability may be utilized to reduce the weight of the overall turbine rotor system. The magnitude of the tensile stresses in the legs 24, 30 may be controlled by the positioning of the engagement between the shoulders 40, 54 and 42, 56. As illustrated in FIG. 5, the second spar engagement shoulder 56 and the second channel engagement shoulder 42 (and also the first spar engagement shoulder 54 and the first channel engagement shoulder 40, not shown in FIG. 5), may instead be machined at an intermediate position along the lengths of the spar 44 and the legs 24, 30. Only the inboard portions (i.e., between the engagements 54, 56 and the web 36) of the legs 24, 30 are loaded in compression, while the outboard portions (i.e., the portions further from the web 36 than are the engagements 54, 56) are in tension. As a result of this alternative configuration, the full centrifugal loads of the channel 22 are not carried through the upper portion of the spar 44, and the wall thicknesses of the spar 44 in that region may be reduced accordingly. This in turn reduces the weight of the spar 44, also allowing the weight of the supporting structure of the disk 72 to be reduced. The selection of the exact radial location of the engagement shoulders 40, 42 and 54, 56 may be optimized according to the material of construction selected for the generally U-shaped flowpath channels 22. The spar 44 is loaded entirely in tension during service, but it is more suitable for tension loading than the generally U-shaped flowpath channel 22 because the spar 44 is made of metal.

The alternating pattern of the generally U-shaped flowpath channels 22 and spars 44 as illustrated in FIGS. 4 and 5 is repeated around the periphery 76 of the turbine disk 72. The result is a flowpath configuration that has alternating suction sides and pressure sides, as in a conventional gas turbine disk structure, but achieved in a different manner that is more amenable to the use of a cooled ceramic material of construction. In service, the hot combustion gases are directed against the pressure sides of each of the respective generally U-shaped flowpath channels 22.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A turbine flowpath structure comprising:
   a first generally U-shaped flowpath channel having
      a first leg having a first inwardly facing side shaped as a turbine blade suction-side airfoil surface,
      a second leg having a second inwardly facing side shaped as a turbine blade pressure-side airfoil surface, and
      a web connecting the first leg and the second leg, wherein the web has an inwardly facing inner flowpath surface; and
   a spar that engages at least one of the first leg and the second leg.

2. The turbine flowpath structure of claim 1, wherein the spar is hollow and has a cooling hole through a wall thereof.

3. The turbine flowpath structure of claim 1, wherein the spar is spaced apart from the engaged one of the first leg and the second leg to define a cooling passage between the spar and the engaged at least one of the first leg and the second leg.

4. The turbine flowpath structure of claim 1, wherein the spar is made of a metallic material.

5. The turbine flowpath structure of claim 1, wherein the spar is made of a nickel-base superalloy.

6. The turbine flowpath structure of claim 1, wherein the spar engages at least one of the first leg and the second leg at a location at an end thereof remote from the web.

7. The turbine flowpath structure of claim 1, wherein the spar engages at least one of the first leg and the second leg at a location intermediate between the web and an end thereof remote from the web.

8. The turbine flowpath structure of claim 1, wherein the U-shaped flowpath channel comprises a ceramic material.

9. The turbine flowpath structure of claim 1, wherein the U-shaped flowpath channel comprises a ceramic-matrix-composite material.

10. The turbine flowpath structure of claim 1, wherein the U-shaped flowpath channel comprises a silicon carbide-silicon carbide composite material.

11. The turbine flowpath structure of claim 1, further including
a second generally U-shaped flowpath channel having a same structure as the first generally U-shaped flowpath channel.

12. The turbine flowpath structure of claim 1, further including
a second generally U-shaped flowpath channel having a same structure as the first generally U-shaped flowpath channel, and
the spar positioned between the first generally U-shaped flowpath channel and the second generally U-shaped flowpath channel, wherein the spar engages the first leg of the first generally U-shaped flowpath channel and the second leg of the second generally U-shaped flowpath channel.

13. The turbine flowpath structure of claim 12, wherein the spar is anchored to a periphery of a turbine disk, thereby holding the first generally U-shaped flowpath channel and the second generally U-shaped flowpath channel to the turbine disk.

14. A turbine flowpath structure mounted to a turbine disk, the turbine flowpath structure comprising:
a first generally U-shaped flowpath channel having
a first leg having a first inwardly facing side shaped as a turbine blade suction-side airfoil surface,
a second leg having a second inwardly facing side shaped as a turbine blade pressure-side airfoil surface, and
a web connecting the first leg and the second leg, wherein the web has an inwardly facing inner flowpath surface;
a second generally U-shaped flowpath channel having
a first leg having a first inwardly facing side shaped as a turbine blade suction-side airfoil surface,
a second leg having a second inwardly facing side shaped as a turbine blade pressure-side airfoil surface, and
a web connecting the first leg and the second leg, wherein the web has an inwardly facing inner flowpath surface; and
a spar positioned between the first generally U-shaped flowpath channel and the second generally U-shaped flowpath channel, wherein an inner end of the spar is anchored to a periphery of the turbine disk so that the spar extends radially outwardly from the periphery of the turbine disk, and wherein the spar engages the first leg of the first generally U-shaped flowpath channel and the second leg of the second generally U-shaped flowpath channel, thereby holding the first generally U-shaped flowpath channel and the second generally U-shaped flowpath channel to the turbine disk.

15. The turbine flowpath structure of claim 14, wherein the first U-shaped flowpath channel and the second U-shaped flowpath channel each comprise a ceramic material.

16. The turbine flowpath structure of claim 14, wherein the first U-shaped flowpath channel and the second U-shaped flowpath channel each comprise a ceramic-matrix-composite material.

17. The turbine flowpath structure of claim 14, wherein the first U-shaped flowpath channel and the second U-shaped flowpath channel each comprise a silicon carbide-silicon carbide composite material.

18. The turbine flowpath structure of claim 14, wherein the spar is made of a metallic material.

19. The turbine flowpath structure of claim 14, wherein the spar is made of a nickel-base superalloy.

20. A turbine flowpath structure mounted to a turbine disk, the turbine flowpath structure comprising:
a plurality of U-shaped flowpath channels, where each U-shaped flowpath channel comprises a ceramic material and has
a first leg having a first inwardly facing side shaped as a turbine blade suction-side airfoil surface,
a second leg having a second inwardly facing side shaped as a turbine blade pressure-side airfoil surface, and
a web connecting the first leg and the second leg, wherein the web has an inwardly facing inner flowpath surface; and
a metallic spar positioned between each adjacent pair of generally U-shaped flowpath channels, wherein an inner end of each spar is anchored to a periphery of the turbine disk so that the spar extends radially outwardly from the periphery of the turbine disk, and wherein the spar engages the first leg of one of the adjacent generally U-shaped flowpath channel and the second leg of the other of the adjacent generally U-shaped flowpath channel, thereby holding the generally U-shaped flowpath channels to the turbine disk.

21. A turbine flowpath structure comprising:
a first generally U-shaped flowpath channel having
a first leg having a first inwardly facing side shaped as a turbine blade suction-side airfoil surface,
a second leg having a second inwardly facing side shaped as a turbine blade pressure-side airfoil surface, and
a web connecting the first leg and the second leg, wherein the web has an inwardly facing inner flowpath surface, wherein
the first leg, the second leg, and the web are a single piece of material.

22. The turbine flowpath structure of claim 21, wherein the U-shaped flowpath channel comprises a ceramic material.

23. The turbine flowpath structure of claim 21, wherein the U-shaped flowpath channel comprises a ceramic-matrix-composite material.

* * * * *